(12) United States Patent
Smoliar et al.

(10) Patent No.: US 7,287,223 B2
(45) Date of Patent: Oct. 23, 2007

(54) SYSTEM FOR EDITING AND ALIGNING CAPTURED EVENTS AND DATA TO A COMMON TIME BASE TO CREATE CUSTOMER SERVICE ENGAGEMENT MULTIMEDIA DOCUMENT

(75) Inventors: Stephen W. Smoliar, Palo Alto, CA (US); John Boreczky, San Leandro, CA (US); Daniel G. Bobrow, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 976 days.

(21) Appl. No.: 10/455,616

(22) Filed: Jun. 6, 2003

(65) Prior Publication Data
US 2004/0260759 A1 Dec. 23, 2004

(51) Int. Cl.
*G06F 3/00* (2006.01)
(52) U.S. Cl. .................. 715/704; 709/223; 709/224
(58) Field of Classification Search ................ 715/704; 717/124; 709/223, 224, 203, 204, 318; 345/855; 707/102, 500; 705/51; 702/188
See application file for complete search history.

(56) References Cited

U.S. PATENT DOCUMENTS

| 6,035,367 A | 3/2000 | Laws |
| 6,167,358 A * | 12/2000 | Othmer et al. ............... 702/188 |
| 6,230,287 B1 | 5/2001 | Pinard et al. |
| 2002/0002562 A1 * | 1/2002 | Moran et al. ................ 707/500 |
| 2002/0038363 A1 * | 3/2002 | MacLean .................... 709/224 |
| 2002/0038388 A1 * | 3/2002 | Netter ........................ 709/318 |
| 2002/0082998 A1 * | 6/2002 | Sastri et al. .................. 705/51 |
| 2002/0087949 A1 * | 7/2002 | Golender et al. ............ 717/124 |
| 2002/0087950 A1 * | 7/2002 | Brodeur et al. ............. 717/124 |
| 2003/0145071 A1 * | 7/2003 | Straut et al. ................ 709/223 |
| 2004/0100507 A1 * | 5/2004 | Hayner et al. .............. 345/855 |
| 2004/0215715 A1 * | 10/2004 | Ehrich et al. ............... 709/203 |

(Continued)

OTHER PUBLICATIONS

A. Girgensohn et al., "Keyframe-Based User Interfaces for Digital Video," *IEEE*, pp. 61-67, Sep. 2001.
A. Girgensohn et al., "Home Video Editing Made Easy—Balancing Automation and User Control," *Human-Computer Information INTERACT '01*, IOS Press, pp. 464-471, 2001.

(Continued)

*Primary Examiner*—Le Hien Luu
(74) *Attorney, Agent, or Firm*—Sughrue Mion, PLLC; Joseph Bach (57) ABSTRACT

When a hardware or software problem reoccurs, a customer is rarely able to remember and repeat the process that was performed by a customer service representative to correct the problem the first time. By capturing desktop events and/or one or more other available data streams during the first customer service engagement, and making a document containing that data available to the customer, the customer can solve a reoccurrence of the problem without having to contact the customer service center. The captured data is integrated into a single multimedia document, which has an indexing capability, highlights critical information, and includes annotations and/or comments. The integrated multimedia document can be distributed to the customer by the customer service representative during an engagement, over a customer accessible network site visited by the customer, or in a CD-ROM provided with the product.

49 Claims, 9 Drawing Sheets

U.S. PATENT DOCUMENTS

2004/0236830 A1* 11/2004 Nelson et al. .............. 709/204
2006/0101051 A1* 5/2006 Carr et al. .................. 707/102

OTHER PUBLICATIONS

M. Ackerman et al., "Answer Garden 2: Merging Organizational Memory with Collaborative Help," *Computer Support Cooperative Work '96*, pp. 97-105, Cambridge, MA, 1996.

N. Yankelovich et al., "Sun™ SharedShell Tool," *CSCW '00*, Philadelphia, PA. p. 351, Dec. 2-6, 2000.

P. Chiu et al., "Room with a Rear View—Meeting Capture in a Multimedia Conference Room," *IEEE*, pp. 48-54, 2000.

"Creating training, demo and presentation videos with ease!", http://www.techsmith.com/products/studio/default.asp (and subsidiary pages).

"HyperCam," http://www.hyperionics.com/hc/index.asp (and subsidiary pages).

"Symantec pcAnywhere," http://enterprisesecurity.symantec.com/products/products.cfm?ProductID=2 (and subsidiary pages).

"Timbuktu Pro Remote Control Software," http://www.netopia.com/en-us/software/products/tb2/ (and subsidiary pages).

* cited by examiner

SYSTEM FOR EDITING AND ALIGNING CAPTURED EVENTS AND DATA TO A COMMON TIME BASE TO CREATE CUSTOMER SERVICE ENGAGEMENT MULTIMEDIA DOCUMENT

BACKGROUND OF THE INVENTION

1. Field of Invention

This invention is directed to systems and methods for capturing interactions between customer service representatives and customers.

2. Description of Related Art

Companies that market technically complex products, such as computer hardware and/or software products typically provide technical support to customers through a customer service engagement. A customer service engagement is initiated when a customer contacts a customer service representative at a customer service center via the telephone or the Internet. The customer service representative can have the customer configure his PC to provide the customer service representative with visibility into the customer's system using existing software tools, such as Sun Microsystems's SharedShell tool, or even to provide the customer service representative with control of the customer's PC using existing software, such as Symantec's pcAnywhere® application. The customer service representative then resolves the customer's problem by giving the customer directions or by directly reconfiguring the customer's system.

SUMMARY OF THE INVENTION

A customer rarely absorbs or retains the knowledge of the techniques and/or actions used by a customer service representative during a customer service engagement. Thus, the customer is often unable to apply the techniques and/or actions should the original problem reoccur. The customer does not always understand the reasons for critical actions the customer service representative made. Additionally, or alternatively, the customer service representative made these techniques and/or actions too quickly, making it difficult for the customer to learn them, or even recognize them. Also, the greater the time span between the original customer service engagement and the reoccurrence of the problem, the greater the likelihood that the customer will forget key aspects of the techniques and/or actions forming the solution. As a consequence, subsequent customer service engagements with the same customer must then be supported by the customer service agent.

In various exemplary embodiments according to this invention, to avoid a costly second customer service engagement with the same customer, a record of the process of the original customer service engagement is made available to the customer. This record can also be made available to other customers who later experience the same problem. By having access to the entire process used in the initial customer service engagement, both types of customers have a greater chance of solving the problem without requiring a costly customer service engagement.

This invention provides systems and methods that automatically capture a customer's computer events and any available audio or video data generated during a customer service engagement.

This invention separately provides systems and methods that process the data captured from one or more data sources during a customer service engagement, and that generate media that correlates the separate data sources, removes, masks or renders unintelligible proprietary or irrelevant data, adds helpful comments and instructions, and/or provides the ability to search the media for relevant sections.

This invention separately provides systems and methods that distribute a captured and edited service engagement multimedia document to one or more customers.

This invention separately provides systems and methods for searching through and viewing portions of a distributed service engagement multimedia document that are useful in solving the customer's problem.

In various exemplary embodiments, the customer initiates a customer service engagement by calling the customer service center or visiting its website. The customer service representative then configures for capture all available data sources, including, but not limited to, computer event data, which can include customer network environment data, customer site video data, customer site audio data, and customer service representative—customer telephone audio data. The captured data files are aligned to a time base and linked to the customer service engagement so that the events in the separate data files can be correlated during an editing process.

After capture, the customer service engagement multimedia data is edited by the customer service center to produce a single product that combines at least some of the captured data from the customer service engagement. Customer sensitive data portions and/or irrelevant data portions of the customer service engagement multimedia document can be removed, masked, blacked out or otherwise rendered unintelligible. Explanations and annotations can be added to highlight augment and/or comment on critical steps and relationships that occur during the customer service engagement. Indexing keywords and error messages can be linked to specific places in the customer service engagement multimedia document to assist the user in finding the information the customer needs to solve the problem the customer is experiencing, without requiring a subsequent, or even a first, customer service engagement.

When editing is complete, the edited customer service engagement multimedia document can be stored on a storage media, which can be distributed to customers. There are several distribution options. In one distribution method, the customer service engagement multimedia document may be posted to a web site, where customers will be able to search for and download any particular customer service engagement multimedia document that the customer needs. In another distribution method, the customer service representative can send a specific customer service engagement multimedia document to customers who have contacted the customer service center for help with a problem dealt with in that customer service engagement. The customer service engagement multimedia document can also be distributed on a CD-ROM or a DVD-ROM, either separately or with the technically complex product at the point of sale.

When using the distributed customer service engagement multimedia document, the customer may view the entire file or select specific segments that are of interest. Sample frames of each segment may be displayed to the customer to allow the customer to select one or more segments of interest. To find the segments of interest, the customer may use keywords or error messages to identify those segments. Once the one or more segments of interest are found, each segment can be viewed, paused, rewound, fast-forwarded, and/or played back, similarly to standard VCR operation.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
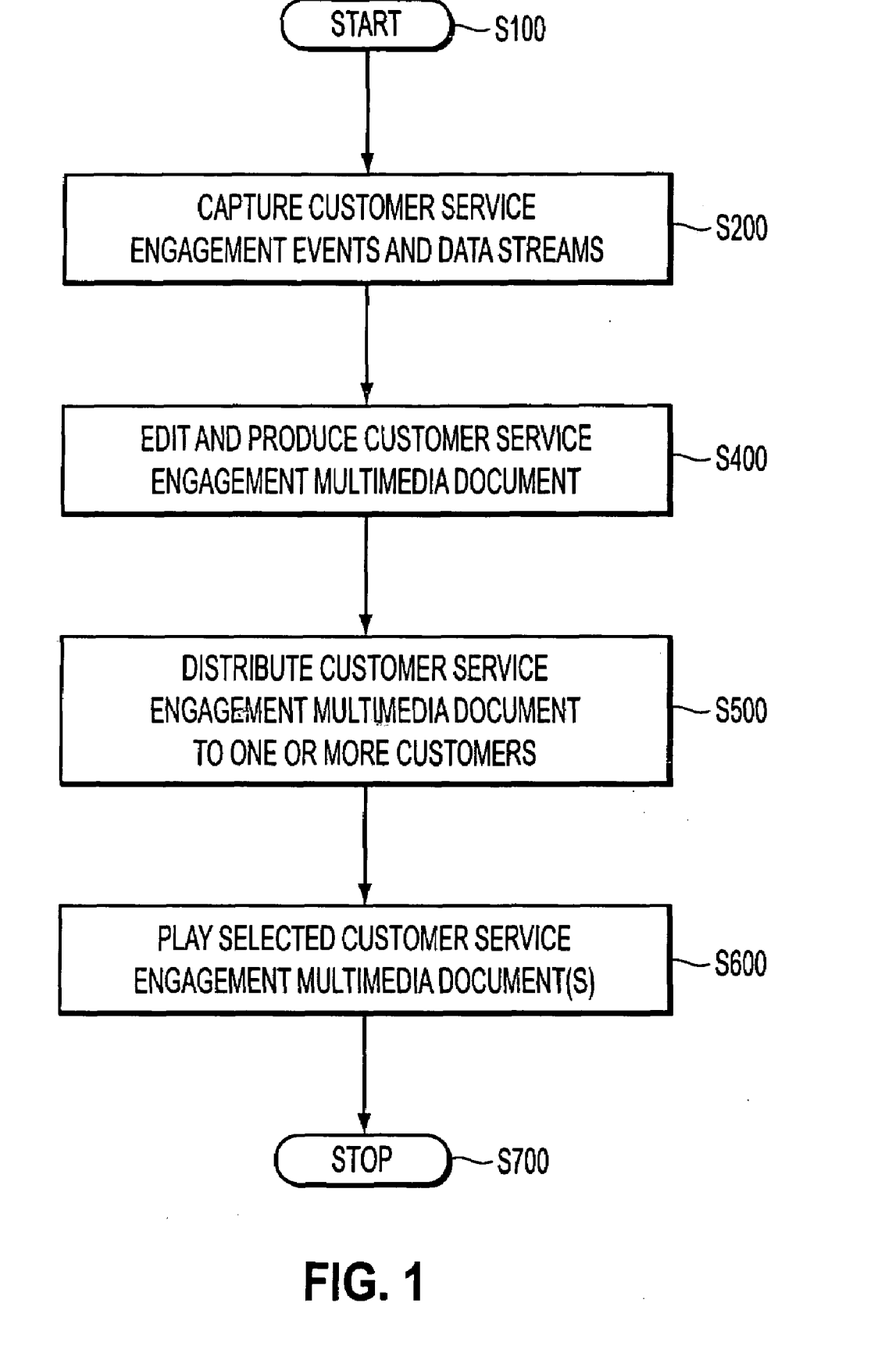
FIG. 1 is a flowchart outlining one exemplary embodiment of a method for capturing, editing, distributing and viewing a customer service engagement according to this invention.

The systems and methods according to this invention capture the events of a customer service engagement and modify the captured data into a form useable by the customer at a future time, to help that customer resolve a reoccurrence of the problem, and/or to help a different customer when that other customer experiences that problem, without assistance from the customer service center. FIG. 1 is a flowchart outlining at a very high level one exemplary embodiment of a method for capturing, editing, distributing and viewing a customer service engagement according to this invention.

As shown in FIG. 1, operation of the method begins in step S100, and continues to step S200, where one or more of computer event data, customer video and/or audio data, and/or telephone conversation data, and/or any other available and appropriate data stream generated during the customer service engagement are captured at the customer service center. Then, in step S400, the captured customer service engagement data is edited at the customer service center to produce a customer service engagement multimedia product or document that is ready for distribution. Next, in step S500, the edited customer service engagement multimedia document is distributed to one or more customers. Then, in step S600, the customer service engagement multimedia document is viewed by one or more customers. Operation then continues to step S700, where operation of the method ends.

Application-sharing and/or operating-system-sharing applications can be used make the customer's local computing environment visible to the customer service representative. If the customer has a video camera, a microphone and/or a computer configured with video/audio capture software, data generated by those devices can be made available to the customer service representative to provide additional information about the customer's local physical environment. Making the customer's local environment visible to the customer service representative assists the customer service representative in understanding how the customer is using the hardware and/or software product. This information can allow the customer service representative to recognize the customer's problem, to recognize when the customer is having problems understanding the customer's hardware and/or software systems and/or to determine if the customer is having problems understanding and/or implementing the customer service representative's instructions.

It should also be appreciated that the customer service representative is not limited to obtaining or being provided with access to the events or activities that occur on the customer's local computing environment, such as, for example, a particular machine that the customer is working on. Rather, in various exemplary embodiments, the customer service representative obtains or is provided with access to information about the larger network environment that the customer's particular machine is incorporated into. It should be appreciated that, in many cases, the problem to be solved arises from the nature of the larger network environment. Thus, the use and implications of that more specialized information about the customer's network context can be the critical data that the customer service representative needs to solve the problem.

Such problems are especially likely to generate customer service interactions, as these specialized conditions are usually not covered explicitly in the standard documentation or help systems. Consequently, recording this wider network context information can make captured customer service engagements even more valuable to the customer when dealing with subsequent encounters with a similar problem. Recording such wider network information can also simplify, and thus make less expensive, subsequent customer service engagements with the customer service representatives, because the subsequent customer service representative will then be able to see what specialized interactions occurred in the customer's wider network environment, and point to the right specialization for the customer.

Figure 2:
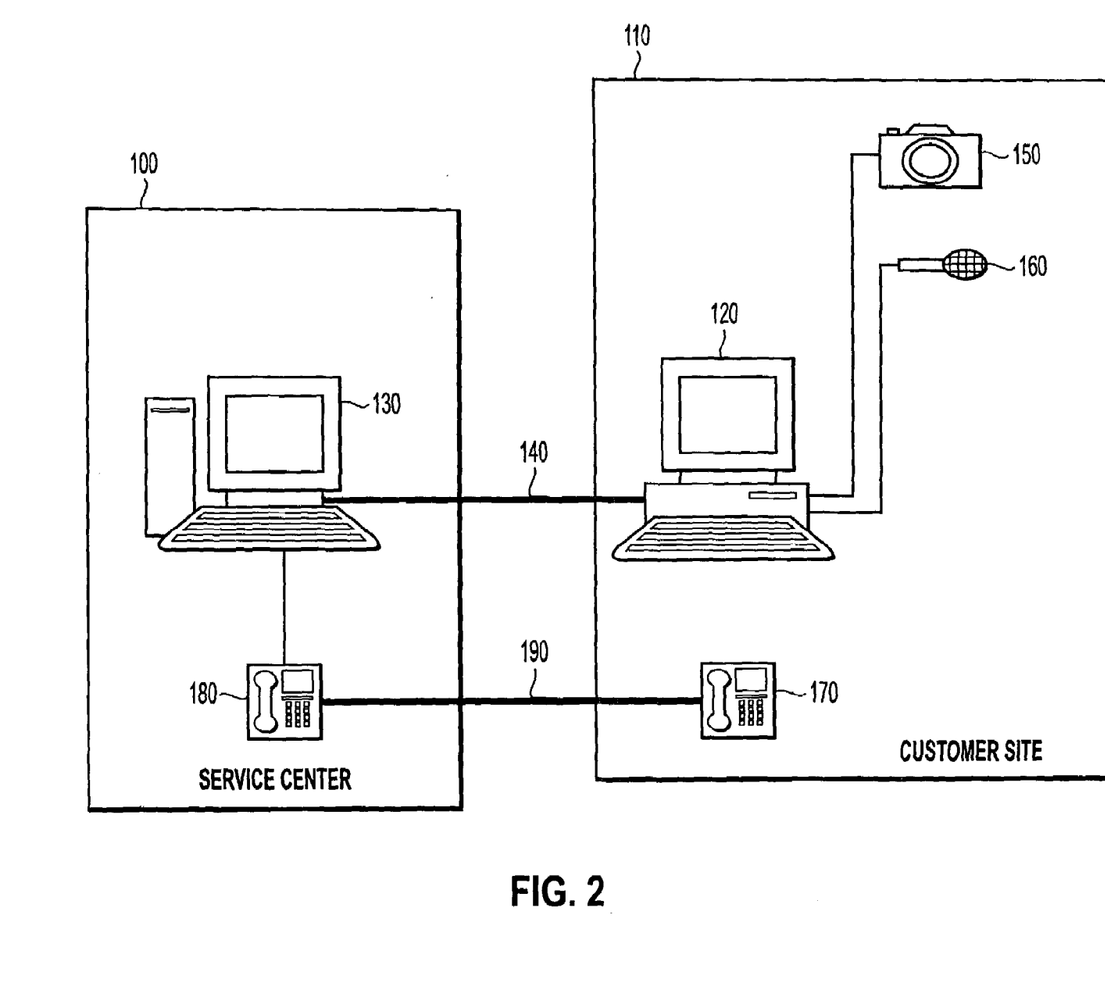
FIG. 2 illustrates one exemplary embodiment of a data flow architecture usable to capture a customer service engagement according to this invention.

FIG. 2 illustrates one exemplary embodiment of a data flow architecture that can be used to capture the various data streams generated during a customer service engagement. As shown in FIG. 2, the service center 100 is contacted by a customer located at a customer site 110. The contact is initiated, for example, when the customer, using the customer platform 120, contacts a web site hosted on the customer service center platform 130 over the network 140 to establish a network connection between the customer platform 120 and the customer service center platform 130. Alternatively, the customer service engagement can be initiated when the customer contacts a customer service representative at the customer service center 100 by telephone. In this case, the customer service representative can initiate the network connection with the customer platform 120. In either situation, an application such as "pcAnywhere" can be used to establish an environment where the customer service provider has the ability to view and/or control the customer platform 120. This permits the customer service representative to correct the problem and log all actions taken during the customer service engagement.

If the customer also, or instead, has the ability to generate video data 150 and/or audio data 160, available applications, such as Camtasia or ScreenCapture, can be used to send the digital video and audio data streams over the network 140 to the customer service center 100. The customer's local video data 150 and/or audio data 160 generated during the customer service engagement can then also be captured at the service center platform 130.

The customer may use a telephone 170 to contact a customer service center telephone 180, either to make initial contact with the customer service center 100 or to provide an audio link after contact is made over the network 140. The customer service center 100 can then capture and log this separate audio data stream of the customer service engagement.

Figure 3:
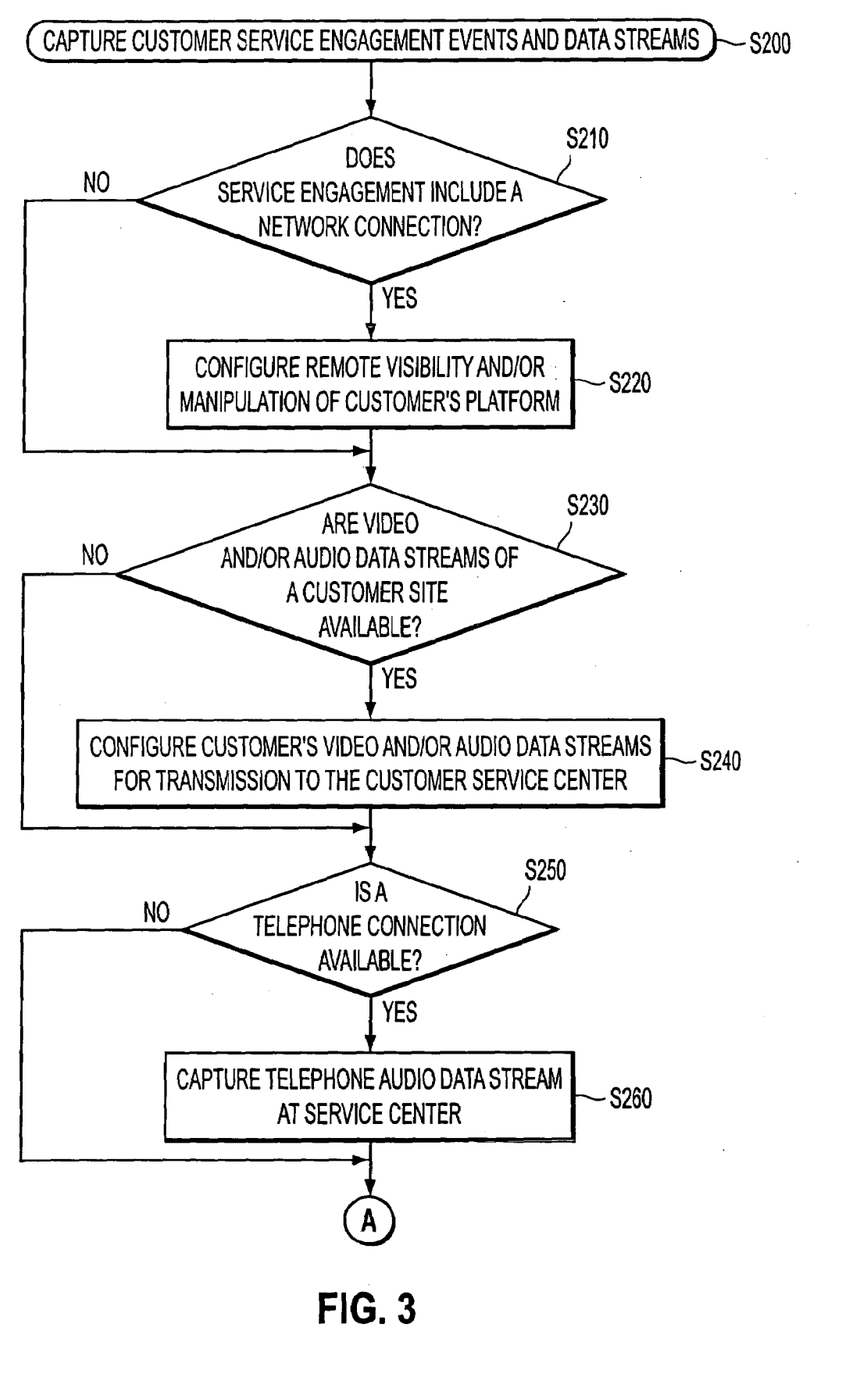
FIGS. 3 and 4 are a flowchart outlining in greater detail one exemplary embodiment of a method for capturing a customer service engagement, according to this invention.
Figure 4:
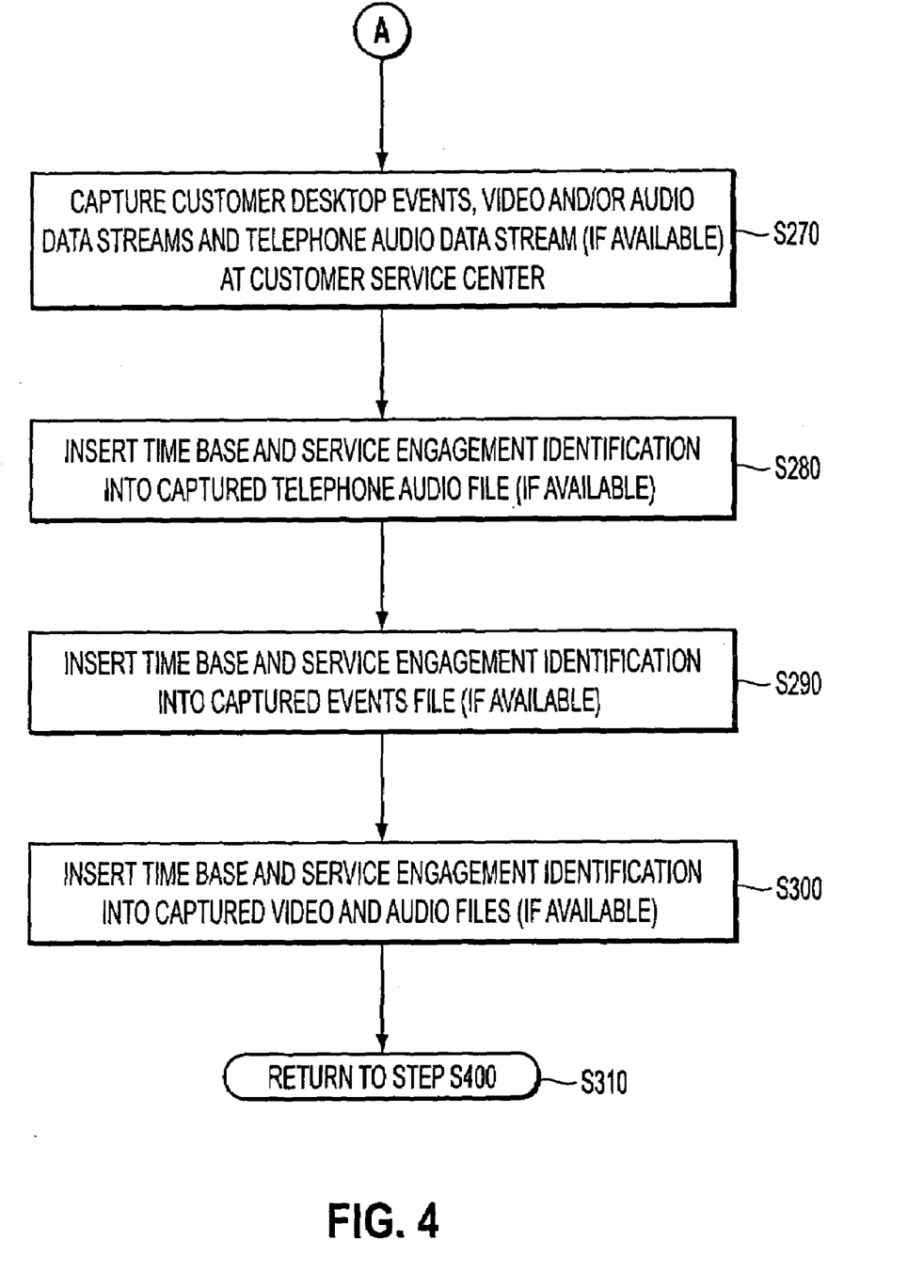

FIGS. 3 and 4 are a flowchart outlining in greater detail one exemplary embodiment of a method for capturing a customer service engagement according to this invention. As shown in FIG. 3, operation of the method begins in step S200, and continues to step S210, where a determination is made whether a network connection is available during the customer service engagement. If a network connection is available, operation continues to step S220. Otherwise, operation jumps to step S240. In step S220, the customer configures the customer's platform 120 for remote visibility and, if desired, manipulation. This is done with the customer service representative's assistance. It should be appreciated that, in general, for privacy concerns, only those functions that the customer is comfortable with sharing are made visible and/or accessible. Operation then continues to step S230.

In step S230, a determination is made whether customer-site video and/or audio data streams are available. If customer-site video and/or audio data streams are available, operation continues to step S240. Otherwise, operation jumps to step S250. In step S240, the customer-site video and/or audio data streams that are available are configured by the customer, at the customer's discretion, for transmission over the network to the customer service center. Next, in step S250, a determination is made whether a telephone connection is available between the customer site and the customer service center. If a telephone connection is available between the customer site and the customer service center, operation continues to step S260. Otherwise, operation jumps directly to step S270. In step S260, the customer service representative configures the telephone audio for captures if the customer service representative has the customer's permission to do so.

In step S270, the remote events that the customer service representative has access to, the remote video and/or audio data streams from the customer site which customer service representative has access to, and/or the captured telephone audio data are captured into an appropriate number of data files. Of course, it should be appreciated that if there are other available data streams, additional steps can be added between steps S260 and S270 so that those additional data streams can be configured. Likewise, it should be appreciated that step S270 encompasses capturing any such available data streams. Operation then continues to step S280.

In step S280, the captured remote event files are associated with a time base and linked to the customer service engagement. Then, in step S290, the captured remote video and audio data stream events are associated with the time base and linked to the customer service engagement. Next, in step S300, the captured telephone audio events are associated with the time base and linked to the customer service engagement. Operation then continues to step S310, where operation returns to step S400.

It should be appreciated that time synchronization of the captured remote video and audio files can be performed manually, semi-manually or fully automatically. It should also be appreciated that time synchronization of the captured telephone audio file can be performed manually, semi-manually or fully automatically. It should further be appreciated that associating the captured remote event files to the time base can be done manually, semi-manually or fully automatically.

Figure 5:
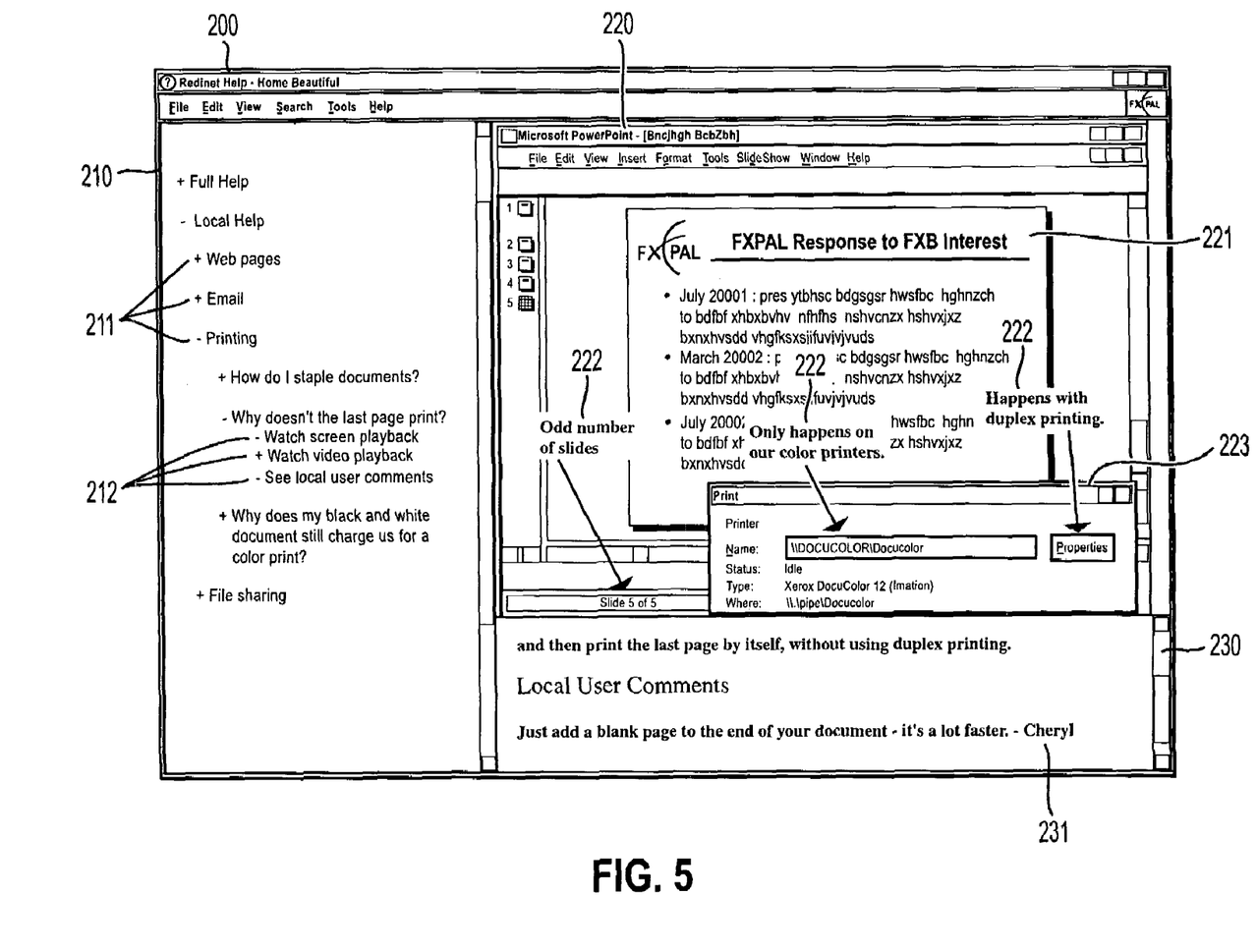
FIG. 5 illustrates one exemplary embodiment of a graphical user interface (GUI) of a customer service engagement display application according to this invention.

FIG. 5 illustrates one exemplary embodiment of a graphical user interface (GUI) 200 of a customer service engagement multimedia display application according to this invention. The graphical user interface 200 includes an index portion 210. Using the index portion 210, the user can select which segment 211 of the customer service engagement multimedia document to view. As shown in FIG. 5, in various exemplary embodiments, the segments 211 can be indexed by problem classification. One exemplary method used to generate such a classification is for a service representative to first augment the customer service engagement multimedia document with a free text summary. The free text summary can then be analyzed by concept creating and classification software, such as that currently offered by Autonomy, to create the index.

It should be appreciated that, in various other exemplary embodiments of the graphical user interface 200, the segments 211 can be indexed by subject keyword. Applications such as MediaDEPO can be used to search audio tracks of the multimedia document for keyword usage, and establish links to that segment of the multimedia document. It should be appreciated that, in various other exemplary embodiments of the graphical user interface 200, the segments 211 can be indexed by error messages, which, for example, a computer hardware and/or software product may generate when a problem occurs. Independent of the type of indexing used, the index portion 210 also includes selectable icons under the index or menu tree that can be used to select which portion or segment of the captured multimedia document to view.

The graphical user interface 200 also includes one or more captured media display portions 220. The captured media display portion 220 shown in FIG. 5 displays the screen events that occurred during the captured customer service engagement. The screen events include customer data 221 displayed during the customer service engagement. It should be appreciated that, in various exemplary embodiments, customer sensitive data can be removed, masked, blacked out or otherwise made illegible or unintelligible during an editing process used to create the displayed multimedia document. One or more annotations 222 can also be added during the editing process to explain and/or highlight critical details on the screen events that are being played back, and/or to point to generalizations of specific situations. Command and menu portions 223 can also be displayed within the graphical user interface 200.

It should be appreciated that the one or more captured media display portions 220 can also be used to display the customer site video data, or any other known or later-developed type of data captured during the customer service engagement. The graphical user interface 200 also includes a comments portion 230 that contains any comments 231 added by the customer and/or by the customer service representative during and/or after the customer service engagement. It should be appreciated that, in various other exemplary embodiments, hyperlinks to network locations providing other problem solving help can be inserted into any of the data shown in the various display portions of the graphical user interface 200.

Figure 6:
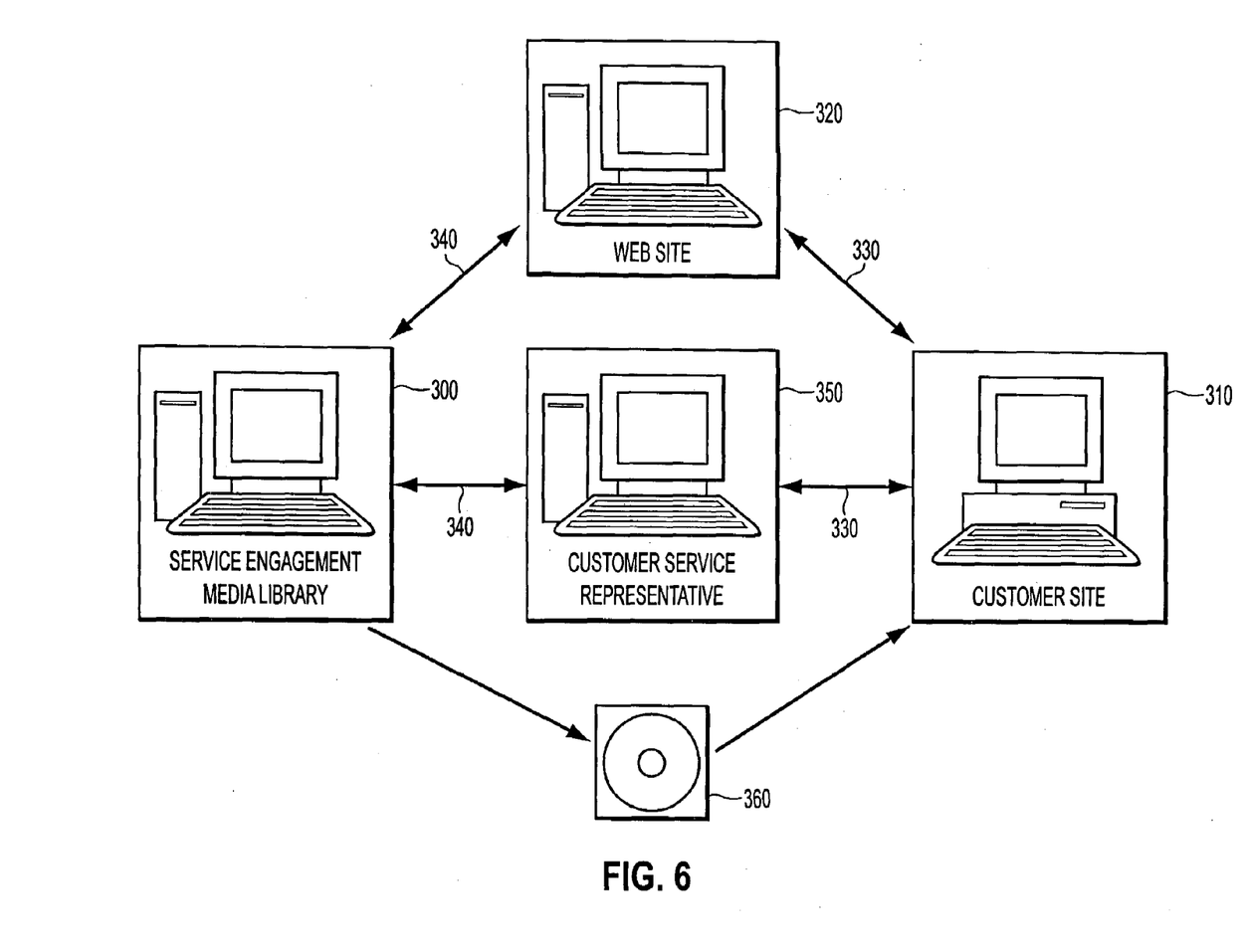
FIG. 6 illustrates one exemplary embodiment of a data flow architecture used to distribute customer service engagement multimedia documents, according to this invention.

FIG. 6 illustrates one exemplary embodiment of a data flow architecture usable to distribute a customer service engagement multimedia document according to this invention. As shown in FIG. 6, the customer service engagement multimedia document is distributed from a service engagement media library 300, which contains one or more edited customer service engagement media files. The customer 310 contacts an accessible web site 320 over a network 330 when the customer needs help resolving a problem occurring with the customer's platform. The accessible web site 320 is used by the customer 310 to select customer service engagement multimedia document that the customer 310 can use to solve the customer's problem.

The accessible web site 320 then retrieves the desired customer service engagement multimedia document from the service engagement library 300 over a network 340. The accessible web site 320 then forwards the customer service engagement multimedia document to the customer 310 over the network 330. It should be appreciated that, instead of providing the service engagement multimedia document on the accessible web site 320, search and/or address location information may be provided on the accessible web site 320, and the service engagement multimedia document may be supplied on request after it has been identified based on the search and/or address location information.

The customer 310 can also contact the customer service representative 350 to receive help with the customer's hardware or software problem. The customer service representative 350 can provide that help by selecting a useful customer service engagement multimedia document and retrieving the selected customer service engagement multimedia document from the service engagement library 300 over the network 340. The customer service representative 350 can then forward the retrieved customer service engagement multimedia document to the customer 310 over the network 330. It should be appreciated that service engagement library 300, the accessible web site 320 and the customer service representative 350 can be collocated at a single service center or can be hosted at separate facilities.

Another distribution method includes distributing a CD-ROM 360 containing one or more edited customer service engagement multimedia documents. The CD-ROM 360 can be provided, for example, to the customer 310 when the hardware and/or software product is purchased. When the customer 310 needs help with the purchased hardware and/or software, the customer inserts the CD-ROM 360, which has an index graphical user interface similar to that shown in FIG. 5, to help the customer 310 find the customer service engagement multimedia document that the customer 310 needs.

Figure 7:
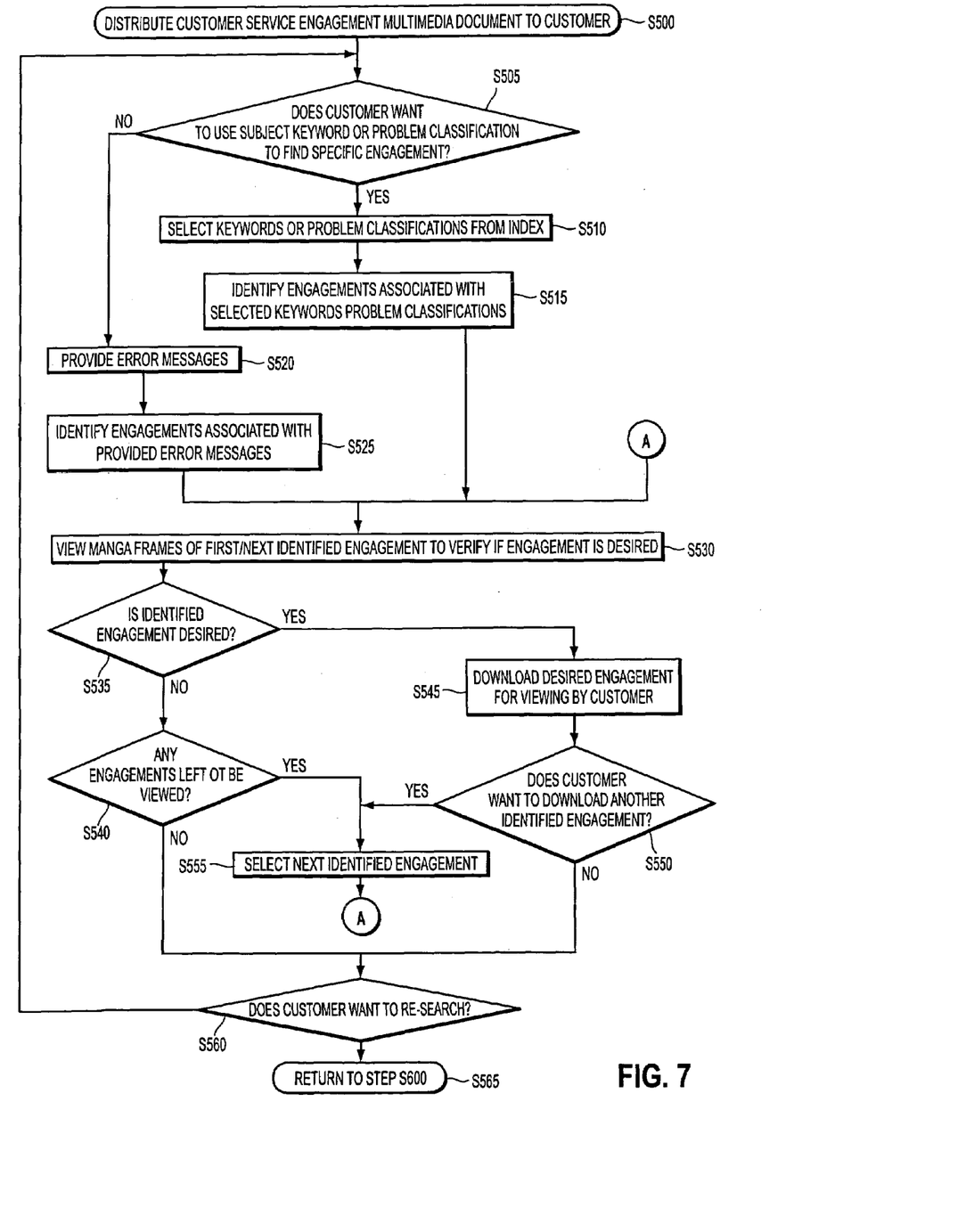
FIG. 7 is a flowchart outlining one exemplary embodiment of a method for distributing a customer service engagement multimedia document to one or more customers according to this invention.

FIG. 7 is a flowchart outlining one exemplary embodiment of a method for distributing service engagement multimedia document to one or more customers according to this invention. As shown in FIG. 7, operation of the method begins in step S500, and continues to step S505, where a determination is made whether the customer or service representative wants to use subject keywords to search for a specific customer service engagement multimedia document. If the customer or service representative wants to use subject keywords or problem classification to search for a specific customer service engagement multimedia document, operation continues to step S510. Otherwise, operation jumps to step S520.

In step S510, the customer or service representative selects subject keywords or problem classification from an index or menu tree. It should be appreciated that, if the customer or service representative knows the subject keywords or problem classification the customer or service representative wishes to use, the customer or service representative can enter directly such as subject keywords or problem classification. Then, in step S515, the customer service engagement media application identifies zero, one or more customer service engagement multimedia documents associated with the selected keywords or problem classification. Operation then jumps to step S530. In contrast, in step S520, the customer or service representative enters the error message that occurred when the customer encountered the problem with the hardware and/or software product. Next, in step S525, the customer service engagement media application identifies zero, one or more customer service engagement multimedia documents associated with the entered error message. Operation then continues to step S530.

In step S530, the customer or service representative views a video summary (also referred to as manga frames) from the first or next identified customer service engagement multimedia document. Then, in step S535, a determination is made whether the viewed customer service engagement multimedia document is a customer service engagement multimedia document that is, or could be, useful in solving the problem with the technically complex product. If the viewed customer service engagement multimedia document is not a useful customer service engagement multimedia document, operation continues to step S540. Otherwise, operation jumps to step S545.

In step S540, a determination is made whether there are any more identified customer service engagement multimedia documents to be viewed. If so, operation jumps to step S555. Otherwise, operation jumps to step S560. In contrast, in step S545, the desired customer service engagement multimedia document is downloaded to the customer. Then, in step S550, a determination is made whether the customer is done or if the customer wants to download any other of the identified customer service engagement multimedia documents. If the customer wants to download any other of the identified customer service engagement multimedia documents, operation continues to step S555. Otherwise, operation jumps to step S560. In step S555, a next identified customer service engagement multimedia document is selected. Operation then returns to step S530.

In step S560, a determination is made whether the customer wants to re-search the available customer service engagement multimedia documents. If so, operation returns to step S505. Otherwise, operation continues to step S565, operation returns to step S600.

Figure 8:
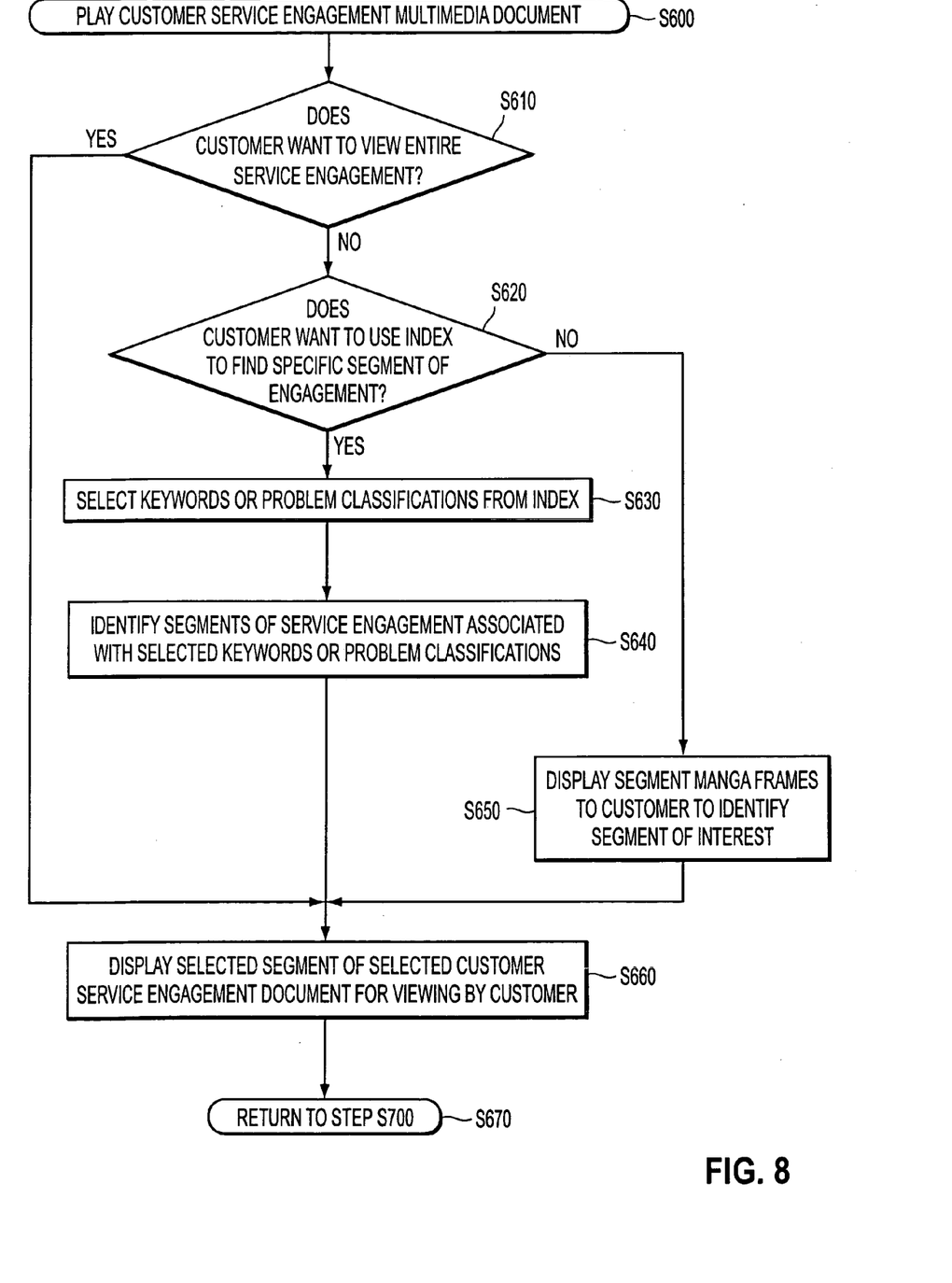
FIG. 8 is a flowchart outlining one exemplary embodiment of a method for playing back a customer service engagement multimedia document, according to this invention.

FIG. 8 is a flowchart outlining one exemplary embodiment of a method for a customer to play back a customer service engagement multimedia document that has been distributed to that customer, according to this invention. As shown in FIG. 8, operation of the method begins in step S600, and continues to step S610, where a determination is made whether the customer wants to view the entire customer service engagement multimedia document. If the customer wants to view the entire customer service engagement multimedia document, operation jumps to step S660. Otherwise, operation continues to step S620.

In step S620, a determination is made whether the customer wants to use subject keywords or problem classification to search for a specific segment of the customer service engagement multimedia document. If the customer wants to use subject keywords or problem classification to search for a specific segment of the customer service engagement multimedia document, operation continues to step S630. Otherwise, operation jumps to step S650. In step S630, the customer or service representative selects subject keywords or problem classification from an index or a menu tree. Then, in step S640, the customer service engagement media application identifies zero, one or more segments of the customer service engagement multimedia document associated with the selected keywords or problem classification.

In contrast, in step S650, the customer views manga frames of each segment to identify zero, one or more segments of interest. The manga frames can be viewed by dragging a cursor along a timeline, or skipping forward or backward to the next detected manga frame. Then, in step S660, the customer displays and views the identified segment(s) of the customer service engagement multimedia document. The segment can be paused, forwarded or backed up, or replayed, similarly to typical VCR functionality. Next, in step S670, operation returns to step S700. It should be appreciated that the customer can repeat the method described in FIG. 8 any number of times taking any path when repeating it.

Figure 9:
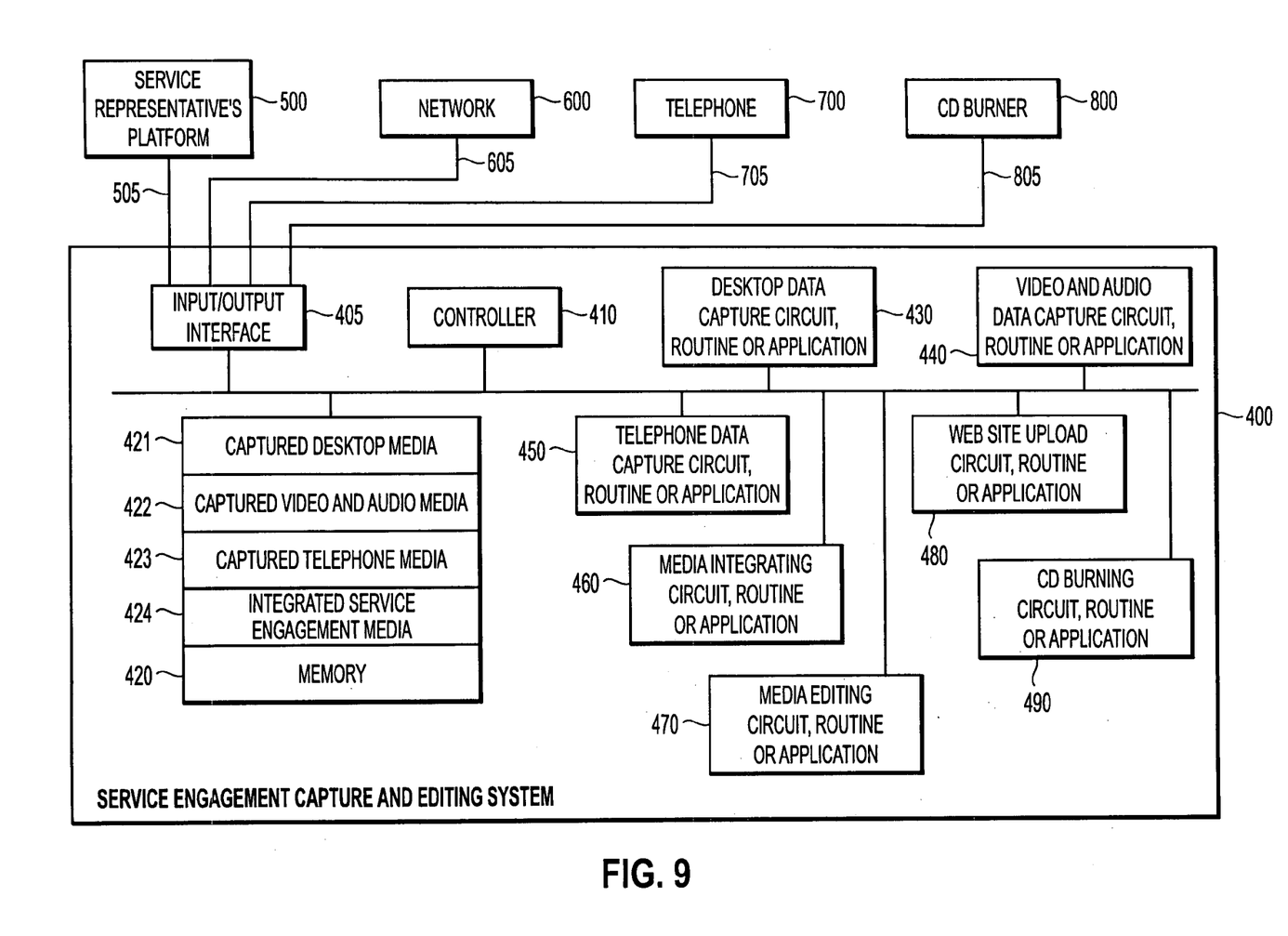
FIG. 9 is a block diagram of one exemplary embodiment of a service engagement capture and editing system according to this invention.

FIG. 9 shows one exemplary embodiment of a service engagement capture and editing system 400 implementing the systems and methods for capturing a customer service engagement multimedia document, and for editing and distributing a customer service engagement multimedia document according to this invention. As shown in FIG. 9, the service engagement capture and editing system 400 includes an input/output interface 405, a controller 410, a memory 420, a desktop data capture circuit, routine or application 430, a video and/or audio data capture circuit, routine or application 440, a telephone data capture circuit, routine or application 450, a media integrating circuit, routine or application 460, a media editing generating circuit, routine or application 470, a web site upload circuit, routine or application 480, and a CD burning circuit, routine or application 490, each interconnected by one or more control and/or data busses and/or application programming interfaces 415. As shown in FIG. 9, a service representative's platform 500, a network 600, a telephone 700 and a CD burner 800 are connected to the service engagement capture and editing system 400 by the links 505, 605, 705 and 805 respectively.

In general, the service representative's platform 500 shown in FIG. 9 can be any known or later developed device that is capable of sending and receiving data over the Internet, an intranet, any other known or later-developed network, and which can be an input and output device for the service engagement capture and editing system 400. In general, the network 600 shown in FIG. 9 can be any known or later-developed communication system, such as the Internet, an intranet or any other known or later-developed system or structure that is capable of routing data and/or messages from one system to another.

In general, the telephone 700 shown in FIG. 9 can be any known or later-developed device or software application that is capable of providing an audio connection with another party such as, for example, interfacing with the public telephone system. In general, the CD burner 800 shown in FIG. 9 can be any known or later-developed device that is capable of writing digital data to a CD or any other known or future developed removable data storage media.

The service representative's platform 500 can be integrated with the service engagement capture and editing system 400, such as in a general-purpose computer connected directly to the Internet or other appropriate network. In addition, the service engagement capture and editing system 400 may be integrated with devices providing additional functions in addition to service representative's platform 500, in a larger system such as a firewall server.

The service representative's platform 500 may be any device and/or software application, such as a general purpose computer, laptop computer, or a special purpose computer, microprocessor or the like, or any other known or later-developed device that can send and/or receive data on the Internet or other appropriate network and input/output the data to/from the service engagement capture and editing system 400.

Each of the links 505, 605, 705 and 805 connecting the service representative's platform 500, the telephone 600, the network 700 and the CD burner to the service engagement capture and editing system 400 can be a connection device, such as a direct cable connection, a modem, a local area network, a wide area network, an intranet, the Internet, any other distributed processing network, or any other known or later-developed connection device. It should be appreciated that each of the links 505, 605, 705 and 805 may include wired and/or wireless portions. In general, each of the links 505, 605, 705 and 805 can include any known or later-developed connection system or structure usable to connect the respective devices to the service engagement capture and editing system 400. It should be understood that the links 505, 605, 705 and 805 do not need to be of the same type.

As shown in FIG. 9, the memory 420 can be implemented using any appropriate combination of alterable, volatile, or non-volatile memory or non-alterable, or fixed memory. The alterable memory, whether volatile or non-volatile can be implemented using any one or more of static or dynamic RAM, a floppy disk and disk drive, a writable or rewritable optical disk and disk drive, a hard drive, flash memory or the like. Similarly, the non-alterable or fixed memory can be implemented using any one or more of ROM, PROM, EPROM, EEPROM, and gaps an optical ROM disk, such as a CD-ROM or DVD-ROM disk and disk drive or the like.

It should also be understood that each of the circuits, routines, applications or managers shown in FIG. 9 can be implemented as portions of a suitably programmed general-purpose computer. Alternatively, each of the circuits, routines, applications or managers shown in FIG. 9 can be implemented as physically distinct hardware circuits within an ASIC, using a digital signal processor (DSP), using a FPGA, a PDL, a PLA and/or a PAL, or using discrete logic elements or discrete circuit elements. The particular form of the circuits, routines, applications or managers shown in FIG. 9 will take is a design choice and will be obvious and predictable to those skilled in the art. It should be appreciated that the circuits, routines, applications or managers shown in FIG. 9 do not need to be of the same design.

When operating the service engagement capture and editing system 400, customer platform events are received from the network 700 over the link 705, or directly from the service representative's platform 500 over the link 505. The input/output interface 405 inputs the customer platform events, and under the control of the controller 410, forwards the customer platform events to the desktop data capture circuit, routine or application 430. If so configured by the service representative, the desktop data capture circuit, routine or application 430 then captures and formats the customer platform events information into a first data file and aligns the customer platform event data to a time base. The desktop data capture circuit, routine or application 430 then stores the first data file in the captured desktop media portion 421 of the memory 420 or forwards it directly to media integrating circuit, routine or application 460.

If available, customer video and/or audio data is received from the network 600 over the link 605, or directly from the service representative's platform 500 over the link 505, as shown in FIG. 9. The input/output interface 405 inputs the customer video and/or audio data, and under the control of the controller 410, forwards the customer video and/or audio data to the video and audio data capture circuit, routine or application 440. If so configured by the service representative, the video and audio data capture circuit, routine or application 440 then captures and formats the video and audio data into a second data file and aligns the customer video and/or audio data to the time base. The video and audio capture data circuit, routine or application 440 then stores the second data file in the captured video and audio media portion 422 of the memory 420 or forwards it directly to media integrating circuit, routine or application 460.

If available, telephone audio data is received from the telephone 700 over the link 705 or directly from the service representative's platform 500 over the link 505, as shown in FIG. 9. The input/output interface 405 inputs the telephone audio data, and under the control of the controller 410, forwards the telephone audio data to the telephone data capture circuit, routine or application 450. If configured by the service representative, the telephone data capture circuit, routine or application 450 then captures and formats the telephone audio data into a third data file and aligns the telephone audio data to the time base. The telephone capture circuit, routine or application 440 then stores the third data file in the captured telephone media portion 423 of the memory 420 or forwards it directly to the media integrating circuit, routine or application 460

It should be appreciated that, in various exemplary embodiments, the telephone audio data may travel over the public switched telephone network. However, it should be appreciated that, in various other exemplary embodiments, the telephone audio data may be replaced by, or implemented by, the customer video and/or audio data. For example, the audio interaction between the customer and the customer service representative can be implemented using a network connection between the customer's platform and the customer service representative's platform, such as Voice over IP (VoIP), NetMeeting or any other known or later-developed technique.

The media integrating circuit, routine or application 460 then retrieves the first-third data files, as well as any other available data stream files, from the captured desktop media portion 421, the captured audio and video media portion 422 and/or the captured telephone media portion 423 of the memory 420, and/or receives them directly under control of the controller 410. The media integrating circuit, routine or application 460 then combines the data files into one integrated service engagement multimedia file or document. The media integrating circuit, routine or application 460, under the control of the controller 410, then stores the integrated service engagement multimedia document in the integrated service engagement media portion 424 of the memory 420, or sends the integrated service engagement multimedia document directly to the media editing circuit, routine or application 470.

The media editing circuit, routine or application 470, under control of the controller 410, retrieves the integrated service engagement multimedia document from the integrated service engagement media portion 424 of the memory 420, or receives it directly. The media editing circuit, routine or application 470 then displays the integrated service engagement multimedia document to the service representative's platform 500 over the link 505 under direction of the controller 410. Editing directives are then received from the service representative's platform 500 over the link 505, and forwarded to the media editing circuit, routine or application 470 under direction of the controller.

The editing directives are used by the media editing circuit, routine or application 470 to remove, mask, black out or otherwise render unintelligible any proprietary and/or extraneous material from the integrated service engagement multimedia document that the customer may not want to make public, and/or to add comments and/or annotations to the integrated service engagement multimedia document. It should be appreciated that the annotations can point to generalizations of specific situations or otherwise provide context information, solution hints and suggestions, and the like. The media editing circuit, routine or application 470, under the control of the controller 410, then stores the integrated service engagement multimedia document in the integrated service engagement media portion 424 of the memory 420, or sends the integrated service engagement multimedia document to the web site upload circuit, routine or application 480 and/or the CD burning circuit, routine or application 490.

The web site upload circuit, routine or application 480, under control of the controller 410, then retrieves integrated service engagement multimedia document from the integrated service engagement media portion 424 of the memory 420, or receives it directly. The web site upload circuit, routine or application 480, under control of the controller 410, uploads one or more service engagement multimedia documents, or its search and address information to one or more customer accessible web servers by sending them to the network 700, over the link 705 under the direction of the controller 410.

In addition to, or instead of, uploading the service engagement multimedia document to the web servers, the CD burning circuit, routine or application 490, under control of the controller 410, retrieves the integrated service engagement multimedia document from the integrated service engagement media portion 424 of the memory 420, or receives it directly. The CD burning circuit, routine or application 490 then formats the customer service engagement multimedia document for writing to a CD and forwards the customer service engagement multimedia document, under the control of the controller 410, to the CD burner 800 over the link 805.

While this invention has been described in conjunction with the exemplary embodiments outlined above, various alternatives, modifications, variations, improvements, and/or substantial equivalents, whether known or that are or may be presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the claims as filed and as they may be amended are intended to embrace all known or later-developed alternatives, modifications variations, improvements, and/or substantial equivalents.

What is claimed is:

1. A method for generating a record of a customer service engagement between a customer located at a customer site and having a problem to be solved and a customer service representative attempting to solve the problem, comprising:

capturing a plurality of events that occur during the customer service engagement;

capturing data of at least one additional data stream that is generated during the customer service engagement;

aligning the captured plurality of events and the captured at least one additional data stream to a common time base;

editing the aligned captured plurality of events and the captured at least one additional data stream to create a customer service engagement multimedia document of the customer service engagement that includes the plurality of events and the at least one additional data stream.

2. The method of claim 1, wherein capturing a plurality of events comprises capturing a plurality of events that occur on a data processing platform of the customer.

3. The method of claim 2, wherein capturing the plurality of events that occur on the data processing platform of the customer comprises capturing desktop events that occur on a computer device of the customer.

4. The method of claim 2, wherein capturing the plurality of events that occur on the data processing platform of the customer comprises:

providing the customer service representative with access to the data processing platform at the customer site, such that the plurality of events are displayed on a data processing device at a customer service location associated with the customer service representative; and storing the displayed plurality of events at the customer service location.

5. The method of claim 1, wherein capturing at least one additional data stream comprises capturing at least one of video data and audio data input at the customer site.

6. The method of claim 5, wherein capturing at least one of the video data and the audio data input at the customer site comprises:

transmitting the captured at least one of the video data and the audio data from the customer site to a customer service location associated with the customer service representative; and storing the transmitted at least one of the video data and the audio data at the customer service location.

7. The method of claim 1, wherein capturing at least one additional data stream comprises capturing telephone audio data between the customer and the customer service representative.

8. The method of claim 7, wherein capturing the telephone audio data comprises:

transmitting the captured telephone audio data from the customer site to a customer service location associated with the customer service representative; and storing the transmitted telephone audio data at the customer service location.

9. The method of claim 1, wherein editing the aligned captured plurality of events and the captured at least one additional data stream to create a customer service engagement multimedia document comprises at least one of:

removing at least one of customer proprietary data and data unnecessary to solve the problem;

masking at least one of customer proprietary data and data unnecessary to solve the problem; and rendering unintelligible at least one of customer proprietary data and data unnecessary to solve the problem.

10. The method of claim 1, wherein editing the aligned captured plurality of events and the captured at least one additional data stream to create a customer service engagement multimedia document comprises adding index information to the customer service engagement multimedia document.

11. The method of claim 10, wherein adding index information comprises adding problem classification information.

12. The method of claim 10, wherein adding index information comprises adding subject keyword information.

13. The method of claim 10, wherein adding index information comprises adding error message information.

14. The method of claim 1, wherein editing the aligned captured plurality of events and the captured at least one additional data stream to create a customer service engagement multimedia document comprises adding at least one of customer comment information and customer service representative comment information.

15. The method of claim 1, wherein editing the aligned captured plurality of events and the captured at least one additional data stream to create a customer service engagement multimedia document comprises adding at least one hyperlink to problem solving information that is stored outside of the customer service engagement multimedia document.

16. The method of claim 1, further comprising distributing the customer service engagement multimedia document to at least one customer who is experiencing the problem, wherein the at least one customer can play the distributed customer service engagement multimedia document to allow the at least one customer to solve the problem.

17. The method of claim 16, wherein distributing the customer service engagement multimedia document comprises:

placing the customer service engagement multimedia document into a library of customer service engagement multimedia documents; and making the library of customer service engagement multimedia documents available to the at least one customer.

18. The method of claim 17, wherein making the library of customer service engagement multimedia documents available to the at least one customer comprises:

searching the library of customer service engagement multimedia documents to identify at least one customer service engagement multimedia document related to the problem; and selecting a desired customer service engagement multimedia document from the identified at least one customer service engagement multimedia document.

19. The method of claim 18, wherein searching the library of customer service engagement multimedia documents to identify at least one customer service engagement multimedia document related to the problem comprises searching the library of customer service engagement multimedia documents based on at least one problem classification indicative of the problem.

20. The method of claim 18, wherein searching the library of customer service engagement multimedia documents to identify at least one customer service engagement multimedia document related to the problem comprises searching the library of customer service engagement multimedia documents based on at least one subject keyword indicative of the problem.

21. The method of claim 18, wherein searching the library of customer service engagement multimedia documents to identify at least one customer service engagement multimedia document related to the problem comprises searching the library of customer service engagement multimedia documents based on at least one error message indicative of the problem.

22. The method of claim 18, wherein searching the library of customer service engagement multimedia documents to identify at least one customer service engagement multimedia document related to the problem comprises viewing manga frames of at least one customer service engagement multimedia document in the library of customer service engagement multimedia documents.

23. The method of claim 17, wherein making the library of customer service engagement multimedia documents available to the at least one customer comprises providing the library of customer service engagement multimedia documents on a customer-accessible network location.

24. The method of claim 17, wherein making the library of customer service engagement multimedia documents available to the at least one customer comprises:
    having the customer service representative search the library of customer service engagement multimedia documents for a desired customer service engagement multimedia document based on the problem; and
    transmitting the selected customer service engagement multimedia document to the at least one customer.

25. The method of claim 17, wherein distributing the customer service engagement multimedia document comprises providing a data storage medium containing at least the customer service engagement multimedia document and a search index to the at least one customer with a product that experiences the problem.

26. A storage medium storing a set of program instructions executable on a data processing device and usable to generate a record of a customer service engagement between a customer located at a customer site and having a problem to be solved and a customer service representative attempting to solve the problem, the set of program instructions comprising:
    instructions for capturing a plurality of events that occur during the customer service engagement;
    instructions for capturing data of at least one additional data stream that is generated during the customer service engagement;
    instructions for aligning the captured plurality of events and the captured at least one additional data stream to a common time base;
    instructions for editing the aligned captured plurality of events and the captured at least one additional data stream to create a customer service engagement multimedia document of the customer service engagement that includes the plurality of events and the at least one additional data stream.

27. The storage medium of claim 26, wherein the instructions for capturing a plurality of events comprise instructions for capturing a plurality of events that occur on a data processing platform of the customer.

28. The storage medium of claim 27, wherein the instructions for capturing the plurality of events that occur on the data processing platform of the customer comprise instructions for capturing desktop events that occur on a computer device of the customer.

29. The storage medium of claim 27, wherein the instructions for capturing the plurality of events that occur on the data processing platform of the customer comprise:
    instructions for providing the customer service representative with access to the data processing platform at the customer site, such that the plurality of events are displayed on a data processing device at a customer service location associated with the customer service representative; and
    instructions for storing the displayed plurality of events at the customer service location.

30. The storage medium of claim 26, wherein the instructions for capturing at least one additional data stream comprise instructions for capturing at least one of video data and audio data input at the customer site.

31. The storage medium of claim 30, wherein the instructions for capturing at least one of the video data and the audio data input at the customer site comprise:
    instructions for transmitting the captured at least one of the video data and the audio data from the customer site to a customer service location associated with the customer service representative; and
    instructions for storing the transmitted at least one of the video data and the audio data at the customer service location.

32. The storage medium of claim 26, wherein the instructions for capturing at least one additional data stream comprise instructions for capturing telephone audio data between the customer and the customer service representative.

33. The storage medium of claim 32, wherein the instructions for capturing the telephone audio data comprise:
    instructions for transmitting the captured telephone audio data from the customer site to a customer service location associated with the customer service representative; and
    instructions for storing the transmitted telephone audio data at the customer service location.

34. The storage medium of claim 26, wherein the instructions for editing the aligned captured plurality of events and the captured at least one additional data stream to create a customer service engagement multimedia document comprise at least one of:
    instructions for removing at least one of customer proprietary data and data unnecessary to solve the problem;
    instructions for masking at least one of customer proprietary data and data unnecessary to solve the problem; and
    instructions for rendering unintelligible at least one of customer proprietary data and data unnecessary to solve the problem.

35. The storage medium of claim 26, wherein the instructions for editing the aligned captured plurality of events and the captured at least one additional data stream to create a customer service engagement multimedia document comprise instructions for adding index information to the customer service engagement multimedia document.

36. The storage medium of claim 35, wherein the instructions for adding index information comprise instructions for adding problem classification information.

37. The storage medium of claim 35, wherein the instructions for adding index information comprise instructions for adding subject keyword information.

38. The storage medium of claim 35, wherein the instructions for adding index information comprise instructions for adding error message information.

39. The storage medium of claim 26, wherein the instructions for editing the aligned captured plurality of events and the captured at least one additional data stream to create a customer service engagement multimedia document comprise instructions for adding at least one of customer comment information and customer service representative comment information.

40. The storage medium of claim 26, wherein the instructions for editing the aligned captured plurality of events and the captured at least one additional data stream to create a customer service engagement multimedia document comprise instructions for adding at least one hyperlink to problem solving information that is stored outside of the customer service engagement multimedia document.

41. The storage medium of claim 26, wherein the set of program instructions further comprises instructions for distributing the customer service engagement multimedia document to at least one customer who is experiencing the problem, wherein the at least one customer can play the distributed customer service engagement multimedia document to allow the at least one customer to solve the problem.

42. The storage medium of claim 41, wherein the instructions for distributing the customer service engagement multimedia document comprise:
  instructions for placing the customer service engagement multimedia document into a library of customer service engagement multimedia documents; and
  instructions for making the library of customer service engagement multimedia documents available to the at least one customer.

43. The storage medium of claim 42, wherein the instructions for making the library of customer service engagement multimedia documents available to the at least one customer comprise:
  instructions for searching the library of customer service engagement multimedia documents to identify at least one customer service engagement multimedia document related to the problem; and
  instructions for selecting a desired customer service engagement multimedia document from the identified at least one customer service engagement multimedia document.

44. The storage medium of claim 43, wherein the instructions for searching the library of customer service engagement multimedia documents to identify at least one customer service engagement multimedia document related to the problem comprise instructions for searching the library of customer service engagement multimedia documents based on at least one problem classification indicative of the problem.

45. The storage medium of claim 43, wherein the instructions for searching the library of customer service engagement multimedia documents to identify at least one customer service engagement multimedia document related to the problem comprise instructions for searching the library of customer service engagement multimedia documents based on at least one subject keyword indicative of the problem.

46. The storage medium of claim 43, wherein the instructions for searching the library of customer service engagement multimedia documents to identify at least one customer service engagement multimedia document related to the problem comprise instructions for searching the library of customer service engagement multimedia documents based on at least one error message indicative of the problem.

47. The storage medium of claim 43, wherein the instructions for searching the library of customer service engagement multimedia documents to identify at least one customer service engagement multimedia document related to the problem comprise instructions for viewing manga frames of at least one customer service engagement multimedia document in the library of customer service engagement multimedia documents.

48. The storage medium of the claim 43, wherein the instructions for making the library of customer service engagement multimedia documents available to the at least one customer further comprise instructions for transmitting the selected customer service engagement multimedia document to the at least one customer.

49. The storage medium of claim 42, wherein the instructions for making the library of customer service engagement multimedia documents available to the at least one customer comprise instructions for providing the library of customer service engagement multimedia documents on a customer-accessible network location.

* * * * *